United States Patent [19]
Katsuki et al.

[11] Patent Number: 6,130,598
[45] Date of Patent: *Oct. 10, 2000

[54] TEMPERATURE DETECTING APPARATUS

[75] Inventors: Nobuharu Katsuki; Tsuyoshi Tanaka, both of Neyagawa; Katsunori Matsubara, Suita; Takashi Tamai, Hirakata; Hiroki Moriwake, Sanda, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,374

[22] Filed: Jan. 8, 1997

[30] Foreign Application Priority Data

Jan. 8, 1996 [JP] Japan ................... 8-000570
Nov. 5, 1996 [JP] Japan ................... 8-292324

[51] Int. Cl.⁷ .................................. H01C 3/04
[52] U.S. Cl. .................... 338/28; 338/25; 338/229; 338/30; 374/185; 374/208
[58] Field of Search ..................... 374/185, 144, 374/123, 208, 209; 338/25, 28, 229, 29, 30

[56] References Cited

U.S. PATENT DOCUMENTS

| | | | |
|---|---|---|---|
| 3,147,457 | 9/1964 | Gill et al. | 338/28 |
| 3,479,631 | 11/1969 | Harget et al. | 338/22 R |
| 4,079,350 | 3/1978 | Sentementes et al. | 338/22 R |
| 4,436,438 | 3/1984 | Voznick | 374/185 |
| 4,445,109 | 4/1984 | Naganoma et al. | 338/25 |
| 4,586,829 | 5/1986 | Hubner et al. | 338/28 |
| 5,247,277 | 9/1993 | Fang et al. | 338/22 R |
| 5,497,139 | 3/1996 | Takahashi et al. | 338/28 |
| 5,749,656 | 5/1998 | Boehm et al. | 338/28 |
| 5,764,130 | 6/1998 | Straub et al. | 338/28 |

FOREIGN PATENT DOCUMENTS

| | | | |
|---|---|---|---|
| 640946 | 5/1962 | Canada | 338/28 |
| 2605804 | 9/1976 | Germany | 338/22 R |
| 44 24 384 | 1/1996 | Germany . | |
| 56-48806 | 11/1981 | Japan | 374/144 |
| 58-86428 | 5/1983 | Japan | 374/185 |
| 849054 | 9/1960 | United Kingdom | 338/28 |

*Primary Examiner*—Karl D. Easthom
*Attorney, Agent, or Firm*—McDermott, Will & Emery

[57] ABSTRACT

The invention relates to a temperature detecting apparatus and an automobile using the same, and is intended to improve the heat response characteristic.

The apparatus comprises a first metal pipe, first and second metal wires accommodated in the first metal pipe, at least one end of each wire being projected from one end of the first metal pipe, an insulator for keeping an electric insulation of the first metal pipe and the first and second metal wires in the first metal pipe, a temperature detecting element projecting out of one end of the first metal pipe and disposed between ends of the first and second metal wires, and a metal cap fitted to one end of the first metal pipe for covering the temperature detecting element, wherein the temperature detecting element is in a substantially flat shape or in a flat shape longer in the length in the direction between the first and second metal wires than the length in the direction at right angle thereto, and a portion of the metal cap opposite to the temperature detecting element is in a flat shape in the same direction in a shape similar to the temperature detecting element.

8 Claims, 11 Drawing Sheets

TEMPERATURE DETECTING APPARATUS

BACKGROUND OF THE INVENTION

1. Field of the Invention

The present invention relates to a temperature detecting apparatus used in detection of temperature of various places and an automobile incorporating the same.

2. Description of Related Art

In the automobile, it has been attempted to purify emissions by installing an emission purifying system in the emission route including a catalytic purifying apparatus. To optimize the performance of the catalytic purifying apparatus to the maximum extent, it is necessary to detect the emission temperature in the emission route by a temperature detecting apparatus (or device).

A conventional temperature detecting device comprises, as shown in FIG. 19 through FIG. 23, a metal pipe 26, two, first and second, metal wires 27 accommodated in the metal pipe 26, at least one end being projected from one end of the metal pipe 26, an insulator 28 for keeping an electric insulation of the metal pipe 26 and the first and second metal wires 27 inside the metal pipe 26, a columnar temperature detecting element 29 provided between ends of the first and second metal wires 27 projecting out of one end of the metal pipe 26, and a metal cap 30 fitted to one end of the metal pipe 26 so as to cover this temperature detecting element 29.

The temperature detecting element 29 is known to be most sensitive to temperature in the portion between the first and second metal wires 27. In such conventional construction, however, since the columnar temperature detecting element 29 is disposed coaxially in the cylindrical metal cap 30, the portion between the first and second metal wires 27 of the temperature detecting element 29 is at a position remote from the outer side of the metal cap 30, and the sensing of heat transmitted from the outer side of the metal cap 30 was dull (or inexact), and the heat response characteristic was poor.

SUMMARY OF THE INVENTION

It is hence an object of the invention to provide a temperature detecting apparatus having excellent heat response characteristic.

To achieve this object, in the invention, the shape of the temperature detecting element has a substantially flat shape longer in the length in the direction between the first and second metal wires (i.e., width of the temperature detecting element) than the length in its right-angle direction, and the portion of the metal cap confronting (or facing) the temperature detecting element also has a substantially flat shape in substantially the same direction, and has a substantially similar shape to the temperature detecting element.

In this construction, the portion of the temperature detecting element between the two metal wires mainly responsible for detecting temperature can be disposed at a position close to the side of the metal cap, and the heat can be detected sensibly (or more precisely), so that the heat response characteristic of the temperature detecting apparatus may be enhanced.

The invention according to claim 1 of the invention relates to a temperature detecting apparatus which comprises a first metal pipe, a first metal wire and a second metal wire accommodated (or placed) in the first metal pipe, at least one end of the first metal wire and the second metal wire being projected from one end of the first metal pipe, an insulator for keeping an electric insulation of the first metal pipe and the first metal wire and the second metal wire in the first metal pipe, a temperature detecting element projecting out of one end of the first metal pipe and disposed between the ends of the first and second metal wires projected from the one end of the first metal pipe, and a metal cap fitted to one end of the first metal pipe for covering the temperature detecting element, in which the temperature detecting element has a substantially flat shape longer in the length in the direction between the first and second metal wires (width of the temperature detecting element) than the length in the direction at right angle thereof, and the portion of the metal cap confronting the temperature detecting element is in a substantially flat shape and in substantially the same direction and same shape (or substantially similar shape) as the temperature detecting element, whereby the heat response characteristic is improved as mentioned above.

The invention according to claims 2 and 9 of the invention relates to a temperature detecting apparatus as set forth in claim 1 or 8 wherein the closed end side of the metal cap, ahead of the open end side fitted to the outer periphery of one end of the first metal pipe, is in a flat shape, whereby it is not necessary to flatten also the first metal pipe, and the first metal pipe of a generally cylindrical shape can be used, thereby minimizing the cost, but also maintaining the strength of the apparatus.

The invention according to claims 3 and 10 of the invention relates to a temperature detecting apparatus as set forth in claim 2 or 9 wherein the opening end of the metal cap (i.e., the open end side of the metal cap) is plastically deformed to the first metal pipe side, so that the opening end of the metal cap is reduced in diameter, and the metal cap and the first metal pipe are welded in this reduced portion, whereby the metal cap and the first metal pipe contact with each other almost in the entire periphery in this reduced portion by reducing the diameter of the metal cap, and the welded state of the both parts (i.e., the first metal pipe and the metal cap) is stable on the whole periphery, and hence the temperature detecting element in the metal cap is kept airtight from the ambient atmosphere so as to be protected.

The invention according to claims 4 and 11 of the invention relates to a temperature detecting apparatus as set forth in claim 3 or 10 wherein the opening of the metal cap is formed by expanding the metal cap from the closed end side toward this opening, whereby the metal cap can be fitted to one end of the first metal pipe.

The invention according to claims 5 and 12 of the invention relates to a temperature detecting apparatus as set forth in claim 3 or 10 wherein the forward side of the metal cap from the fitting portion to the first metal pipe is in a shape gradually flat toward the closed end, whereby, different from immediate flat processing of the metal cap at one end of the first metal pipe, it is effective to prevent lowering of insulation resistance due to too close distance (undue proximity) between the metal cap and the first and second metal wires at one end side of the metal pipe.

The invention according to claims 6 and 13 of the invention relates to a temperature detecting apparatus as set forth in claim 5 or 12 wherein the metal cap is gradually reduced in wall thickness from the opening toward the closed end, whereby heat can be transmitted to the temperature detecting element more quickly as the wall thickness is thin at the closed end of the metal cap accommodating the temperature detecting element, and hence heat response performance is improved, and such reduction of wall thickness can be easily formed by a drawing process.

The invention according to claim 7 of the invention relates to a temperature detecting apparatus as set forth in claim 1 wherein at least one of the metal cap and the first metal pipe is heat treated at a higher temperature than the maximum operating temperature before welding of the metal cap and the first metal pipe, whereby a rigid oxide film is formed on the heat treated surface of the metal cap or the first metal pipe, and therefore the characteristic of the temperature detecting element does not deteriorate due to forming of an oxide film by depriving of oxygen in the temperature detecting element during use or release of undesired gas from the metal cap or from the first metal pipe surface.

The invention according to claim 8 of the invention relates to a temperature detecting apparatus as set forth in claim 1 wherein a bump is formed in one of a fitting portions of the first metal pipe or the metal cap and a recess to be fitted with the bump is formed in the other of the fitting portions of the first metal pipe or the metal cap, whereby the metal cap of flat shape can be mounted correctly on the temperature detecting element of a same substantially flat shape, and hence damage of the temperature detecting element can be prevented and the improvement of heat response performance obtained by combination of the flat shapes will not be impeded.

The invention according to claim 14 of the invention relates to a temperature detecting apparatus wherein a recess is formed between the first and second metal wires of the temperature detecting element in a substantially flat shape, wherein the recess formed on the surface of the temperature detecting element can prevent significant drop of insulation resistance between the metal wire and metal cap which may be caused as a result of contact of the surface of the temperature detecting element with the inner surface of the metal cap in a plane state.

The invention according to claim 15 of the invention relates to a temperature detecting apparatus forming a protrusion projecting toward the temperature detecting element side in a flat portion of the metal cap confronting the temperature detecting element, wherein such formation of a protrusion in the metal cap does not allow this protrusion to contact in a plane state if contacting with the temperature detecting element in a spot state, thereby preventing significant lowering of insulation resistance between the metal cap and metal wire.

The invention according to claim 16 of the invention relates to an automobile comprising a temperature detecting apparatus as set forth in claim 1 disposed in an emission route, wherein various adequate controls can be effected corresponding to the emission temperature detected by the temperature detecting apparatus of excellent heat response performance.

The invention according to claim 17 of the invention relates to an automobile as set forth in claim 16 wherein the temperature detecting apparatus is disposed so that the width direction (longitudinal direction) of the temperature detecting element in a flat shape confronting the emission route coincides with the flow direction of emission, whereby the emission flows at both sides of the first metal pipe of flat shape, and the first metal cap receives heat in a wide area, so that the heat response performance may be further enhanced, thereby realizing a more adequate control for the automobile.

The invention is also directed to a method of detecting temperature of our (an) environment with the apparatus of the invention. The environment may be automobile emissions, liquid or gas. The invention according to claim 19 relates to such a method, comprising inserting the temperature detecting apparatus into the environment and recording the temperature by visual observation or electronic or mechanical means, such as by a computer or mechanical sensor. The apparatus comprises a first metal pipe, a first metal wire and a second metal wire placed in the first metal pipe, at least one end of the first metal wire and at least one end of the second metal wire being projected from one end of the first metal pipe, an insulator for keeping an electric insulation of the first metal pipe and the first metal wire and the second metal wire in the first metal pipe, a temperature detecting element projecting out of one end of the first metal pipe and disposed between the ends of the first metal wire and the second metal wire, and a metal cap fitted to one end of the first metal pipe for covering the temperature detecting element, wherein the temperature detecting element has a substantially flat shape longer in the length in the direction between the first and second metal wires (width dimension) than the length in the direction at right angle to the width dimension, and a portion of the metal cap confronting the temperature detecting element has a substantially flat shape in substantially the same direction and a shape substantially similar to the temperature detecting element.

The invention according to claim 21 is directed to a method, as set forth in claim 19 wherein in the apparatus a bump is formed in one of a fitting portions of the first metal pipe or the metal cap and a recess to be fitted with the bump is formed in the other of the fitting portions of the first metal pipe or the metal cap, whereby the metal cap of flat shape can be mounted correctly on the temperature detecting element of a same substantially flat shape, and hence damage of the temperature detecting element can be prevented and the improvement of heat response performance obtained by combination of the flat shapes will not be impeded.

The invention according to claim 12 is directed to such a method wherein in the apparatus a recess is formed between the first and second metal wires of the temperature detecting element in a substantially flat shape, wherein the recess formed on the surface of the temperature detecting element can prevent significant drop of insulation resistance between the metal wire and metal cap which may be caused as a result of contact of the surface of the temperature detecting element with the inner surface of the metal cap in a plane state.

The invention according to claim 25 is directed to such a method wherein in the apparatus there is formed a protrusion projecting toward the temperature detecting element side in a flat portion of the metal cap confronting the temperature detecting element, wherein such formation of a protrusion in the metal cap does not allow this protrusion to contact in a plane state if contacting with the temperature detecting element in a spot state, thereby preventing significant lowering of insulation resistance between the metal cap and metal wire.

DESCRIPTION OF THE PREFERRED EMBODIMENTS

Figure 1:
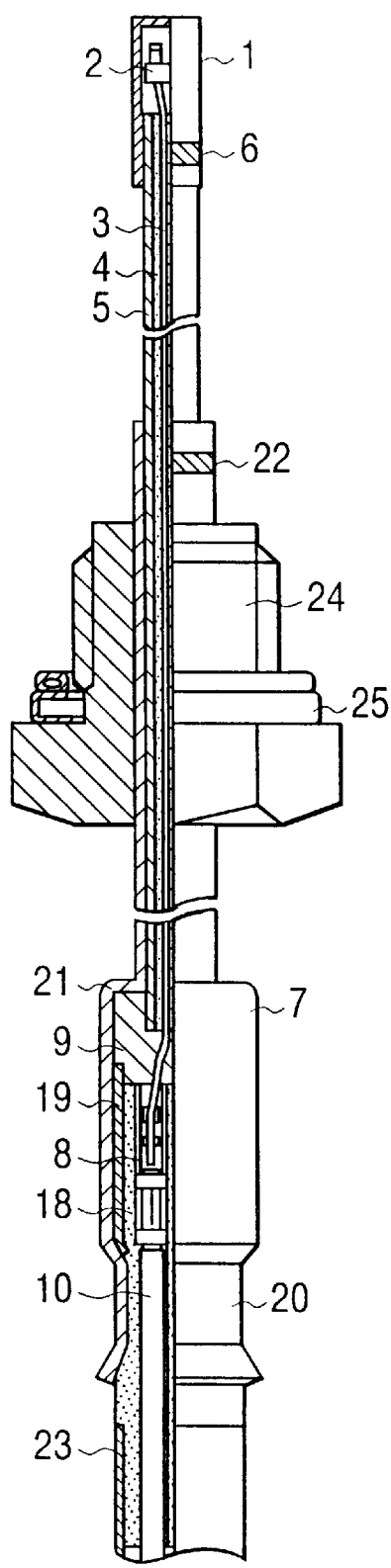
FIG. 1 is a front view showing a section of a half of a temperature detecting apparatus in an embodiment of the invention.

Referring now to the drawings, embodiments of the invention are described in detail below.

Figure 2:
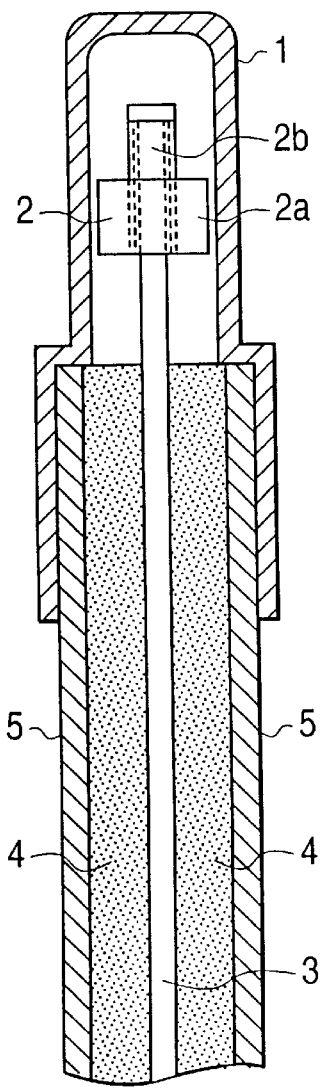
FIG. 2 is a magnified side sectional view of a temperature detecting element portion of the apparatus of FIG. 1.
Figure 3:
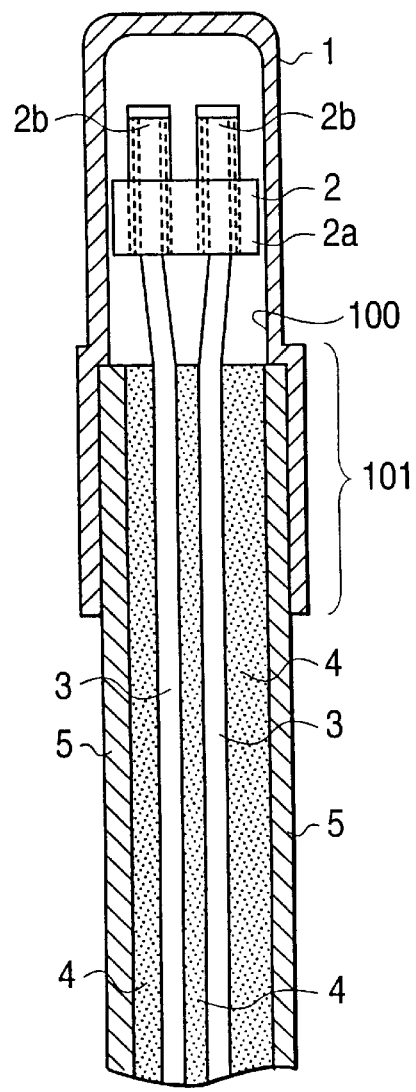
FIG. 3 is a magnified front sectional view of the temperature detecting element portion of the apparatus of FIGS. 1 and 2.
Figure 4:
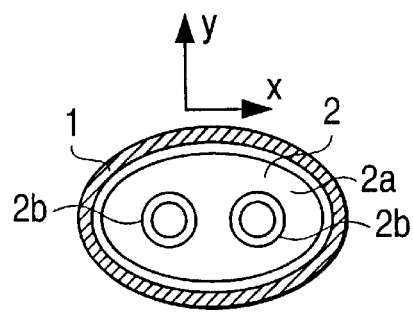
FIG. 4 is a top view of a temperature detecting element of a temperature detecting apparatus in an embodiment of the invention.
Figure 5:
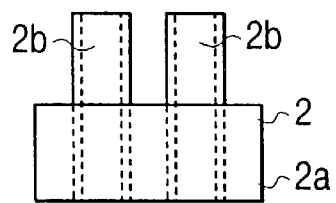
FIG. 5 is a front view of the temperature detecting element of FIG. 4.

As shown in FIG. 1 to FIG. 3, the temperature detecting apparatus of the invention has construction similar to the conventional construction and, comprises a first metal pipe 5, a first metal wire and a second metal wire 3 (also referred to here as "first and second metal wires") accommodated in the first metal pipe 5, at least one end of each metal wire being projected from one end of the first metal pipe 5, an insulator 4 for keeping an electric insulation of the first metal pipe 5 and the first and second metal wires 3 in the first metal pipe 5, a temperature detecting element 2 projecting out of one end of the first metal pipe 5 and disposed between ends of the first and second metal wires 3, and a metal cap 1 fitted to one end of the first metal pipe 5 for covering the temperature detecting element 2. Reference numeral 3 denotes two metal wires, which are preferably 0.3 mm in diameter. Substantially around and on the entire periphery (or length) of the two metal wires, excluding both ends of the two metal wires 3, there is disposed the first metal pipe 5, preferably having a cylindrical shape, 2.8 mm in outside diameter, and the spacing between the metal wires 3 and the first metal pipe 5 is filled with the insulator 4, preferably made of MgO, to form a two-core tube. At each end of these two metal wires 3, as shown in FIG. 4 and FIG. 5, the temperature detecting element 2 of a substantially flat, and preferably flat shape, is connected as shown in FIG. 2 and FIG. 3, and an opening 100 (FIG. 3) of the metal cap 1 of a tubular form with a bottom of the opening closed at one end so as to accommodate the temperature detecting element 2 is fitted by a flange 101 to the outer periphery of one end of the first metal pipe 5. In one preferred embodiment, the metal cap 1 is made of a material of SUS310S of 0.5 mm in thickness. The opening of the metal cap is cylindrical, and the closed end side (opposite the opening 100) is in a flat shape substantially corresponding to the shape of the temperature detecting element 2 as shown in FIG. 2 to FIG. 4. The opening of this metal cap 1 is fitted to the outer periphery of one end of the first metal pipe 5, and the first metal pipe 5 and the metal cap 1 are joined on the circumference by any suitable means, preferably by a weld zone 6 by laser welding, and the inside of the metal cap 1 is kept airtight. In one specific embodiment, the metal cap 1 has a flat shape as mentioned above, and measures 3.8 mm in the width direction (i.e., longitudinal direction or direction along axis "x" in FIG. 4), and 2.9 mm in the thickness direction (i.e., direction along axis "y" in FIG. 4 which is perpendicular to the width direction). Moreover, as shown in FIG. 4 and FIG. 5, in the temperature detecting element 2, two tubular electrodes 2b, preferably made of platinum material, are buried in the portion of a thermistor 2a of a flat shape, and the electrodes 2b penetrate through the thermistor 2a. The temperature detecting element 2 is constructed so that the central axis of the portion of the thermistor 2a may be parallel to the central axis of the electrodes 2b. The temperature detecting element 2 is in a flat shape longer in the length (width) in the direction between the first and second metal wires (i.e., a direction along the axis "x" in FIG. 4) than the length (thickness) in the direction at right angle thereto. In one preferred embodiment, the flat shape of the temperature detecting element measures 2.4 mm in the width direction (longitudinal direction) and 1.5 mm in the thickness direction. As shown in FIG. 2 and FIG. 3, the metal wires 3 penetrate inside of the electrodes 2b of the temperature detecting element 2, and are electrically connected by welding at the leading end of the electrodes 2b. The thickness direction of the temperature detecting element 2 in flat shape is designed to substantially correspond to (or coincide with) the thickness direction of the metal cap 1 which has a flat shape.

The heat response characteristic of the temperature detecting apparatus in the above embodiment and the characteristic of the conventional temperature detecting apparatus are shown in Table 1.

TABLE 1

| | Heat Response Time | Constituent of Tested Sample | | |
|---|---|---|---|---|
| | | Name of Components | Item | Dimension or Material |
| This Invention | 10–11 sec | metal wire (3): | diameter | 0.3 mm |
| | | first metal pipe (5): | outer diameter | 2.8 mm |
| | | metal cap (1): | material | SUS310S |
| | | | thickness of material | 0.5 mm |
| | | | width | 3.8 mm |
| | | | thickness | 2.9 mm |
| | | temperature detecting element (2): | width | 2.4 mm |
| | | | thickness | 1.5 mm |
| Prior Art | 28–30 sec | metal wire (27): | diameter | 0.5 mm |
| | | metal pipe (26): | outer diameter | 4.8 mm |
| | | metal cap (30): | material | SUS310S |
| | | | thickness of material | 0.5 mm |
| | | | outer diameter | 6.0 mm |
| | | temperature detecting element (29): | diameter | 3.6 mm |

As known from Table 1, the heat response time is 28 to 30 seconds in the prior art, and 10 to 11 seconds in the embodiment of the invention. The improved response is achieved by lowering of thermal capacity by reducing the size of the metal wires 3, the insulator 4, the first metal pipe 5, the metal cap 1, and temperature detecting element 2, flat shape of the closed end side of the metal cap 1, and flat shape of the section of the temperature detecting element 2 accommodated in the space of the metal cap 1, so that the heat response performance of 11 seconds or less may be assured. The heat response characteristic of 11 seconds or less is sufficient to enable the temperature detecting apparatus to be used in conjunction with an emission purifying system.

Figure 6:
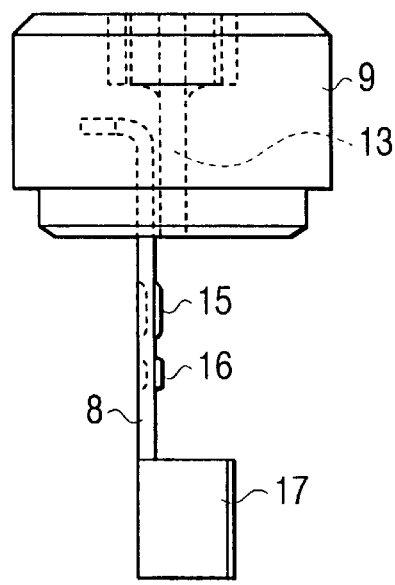
FIG. 6 is a side view of a terminal fixing element of a temperature detecting apparatus in an embodiment of the invention.
Figure 7:
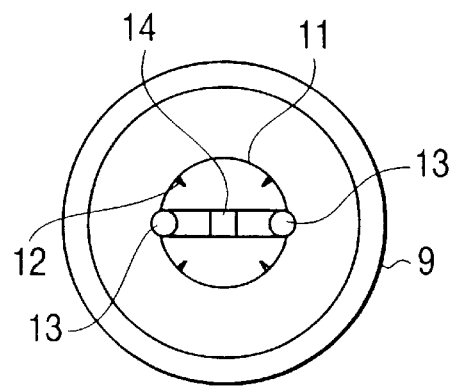
FIG. 7 is a top view of the terminal fixing element of FIG. 6.

Next, as schematically shown in FIGS. 1, 6 and 7, each one of the other ends of the metal wires 3 is electrically connected with one end of a lead wire 10 through a relay terminal 8. Two relay terminals 8 are integrated on a terminal fixing element 9 in a state of the leading ends bent at right angle as shown in FIG. 6 and FIG. 7. The terminal fixing element 9 is formed of an insulating resin, and a receiving port 11 in which the other end of the first metal pipe 5 is inserted is formed at its leading end side, and when the other end of the first metal pipe 5 is inserted into this receiving port 11, four ribs 12 shown in FIG. 7 provided inside are deformed, and this action causes to fix the other end of the first metal pipe 5. That is, the rear end of the first metal pipe 5 is press-fitted and fixed in this receiving port 11. Two penetration holes 13 are provided in the receiving port 11 of the terminal fixing element 9, and a partition 14 is provided between them, and the leading ends of the penetration holes 13 are expanded toward the partition 14. More specifically, the rear ends of the metal wires 3 are separated in the partition 14, and penetrate through the penetration holes 13 along the slope, and are pushed out onto the respective relay terminals 8. In the portions of the relay terminals 8 in which the metal wires 3 are extruded, as shown in FIG. 6, two weld zones 15, 16 differing in length are provided, and these weld zones 15, 16 are formed by extruding the relay terminals 8 at specific interval to the surface sides. Therefore, by resistance welding of these extruded metal wires 3, the welding resistance in the weld zones 15, 16 is higher than when the weld zones 15, 16 are integrated, and the welding resistance of the weld zones 15, 16 is also different, and portions having two different weld strengths are obtained, so that a secure and redundant structure is realized. Meanwhile, a leading end of the lead wire 10 is fixed to the junction 17 at the rear end of the relay terminal 8 by welding.

Moreover, the leading ends of the two relay terminals 8 and two lead wires 10 are respectively put into two penetration holes of a waterproof tube 18 of rubber material in order to keep waterproof. This waterproof structure is described below, and as shown in FIG. 1, the leading end of the waterproof tube 18 abuts against the rear end of the terminal fixing element 9, and an aluminum metal fixing tube 19 thinner than the 0.3 mm thick second metal pipe 7 is mounted on the outer circumference of this portion. In this case, the second metal pipe 7 positioned at the leading end side of the terminal fixing element 9 is processed by drawing so that the leading end side is reduced in diameter as compared with the terminal fixing element 9 as shown in FIG. 1, and hence the leading end of the terminal fixing element 9 abuts against the step of the second metal pipe 7. Therefore, by processing by drawing the second metal pipe 7 positioned at the rear end side of the metal fixing tube 19 so as to be reduced in diameter over the entire circumference as shown in FIG. 1, the terminal fixing element 9 is pressed and fixed to the step 21 through the metal fixing tube 19 by this drawn portion 20. In this state, the internal waterproof tube 18 is compressed by the drawn portion 20, and hence the drawn portion 20, waterproof tube 18, and armor of lead wire 10 are compressed. The reduced diameter end portion of the second metal pipe 7 is positioned outside of the first metal pipe 5 as shown in FIG. 1, and the both are fixed by laser welding 22, and are also kept airtight. In this way, the inside of the second metal pipe 7 is kept waterproof. In the constitution of fixing the terminal fixing element 9 on the second metal pipe 7, if a tensile force is applied to the lead wire 10, its force reaches only up to the relay terminal 8 integrated with the terminal fixing element 9, and hence no force is applied to the thin metal wire 3 of 0.3 mm in diameter with the strength of 10 kgf (98N), so that the wire may not be broken.

Incidentally, the rear end of the metal fixing tube 19 is deformed inward by the drawn portion 20, and the waterproof tube 18 is provided inside, and the portion corresponding to the deformed portion extends up to the leading end of the armor of the lead wire 10, so that contact with the relay terminal 8 never occurs.

In FIG. 1, reference numeral 23 is a tube for protection of lead wire. Reference numeral 24 is a mounting screw fitted to the second metal pipe 7, and the temperature detecting element 2 is mounted by this mounting screw 24 to confront the high temperature emission. Reference numeral 25 is a gasket used at this time.

Figure 8:
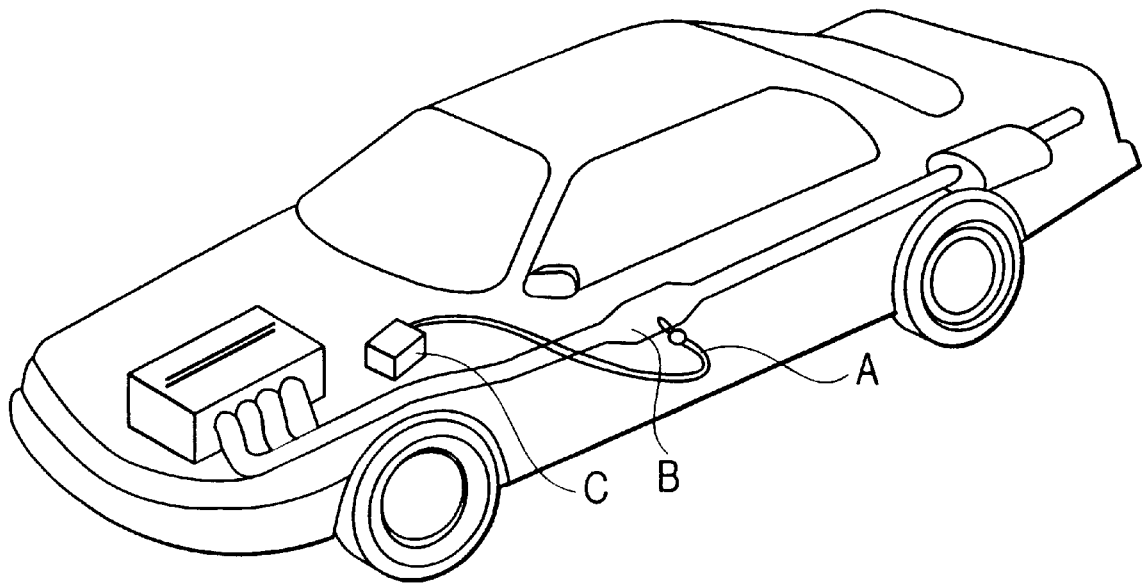
FIG. 8 is a perspective view of an automobile including a temperature detecting apparatus of the invention.

In FIG. 8, a temperature detecting apparatus A is installed in a catalytic purifying apparatus of an emission route B of an automobile, and it is intended to control adequately by a controller C in response to the emission temperature detected by the temperature detecting apparatus A of excellent heat response characteristic.

The temperature detecting apparatus A is installed so that the width direction (longitudinal direction) of the temperature detecting element in flat shape may coincide with the flow direction of emission in the emission route B, whereby the emission flows at both sides of the first metal pipe of flat shape. In this way, the first metal cap 1 receives heat in a wide area, and thereby the heat response characteristic may be further enhanced, so that a more adequate control for the automobile may be realized.

Figure 9:
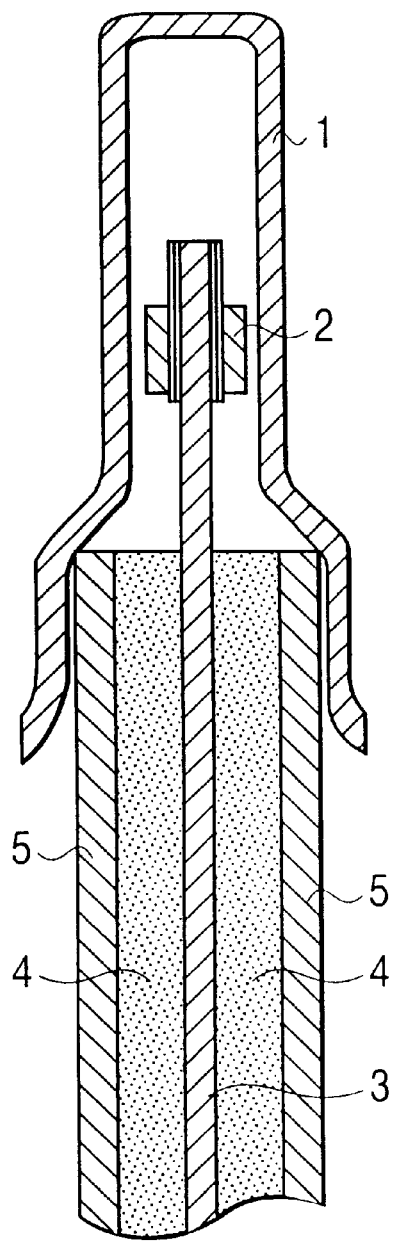
FIG. 9 is a magnified side sectional view of a temperature detecting element portion in a different embodiment of the invention.
Figure 10:
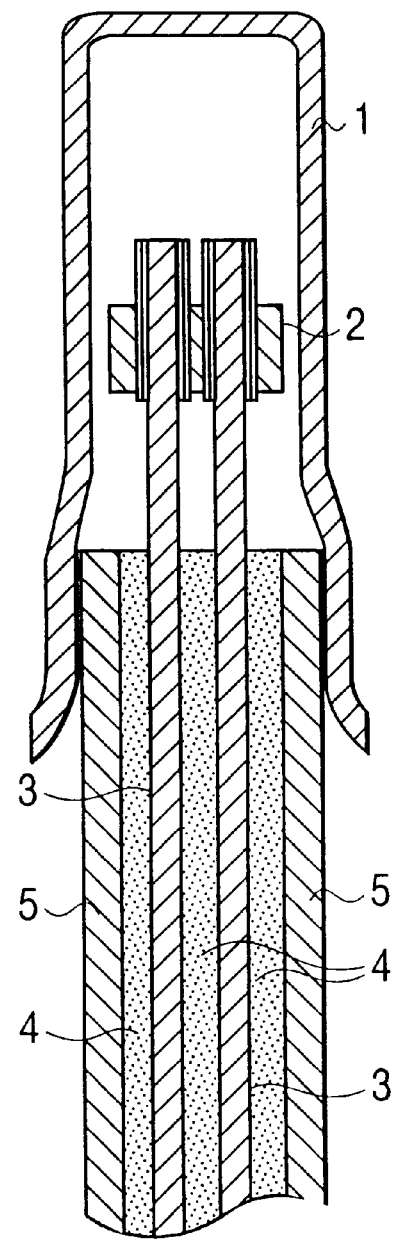
FIG. 10 is a magnified front view of the temperature detecting element portion of FIG. 9.

FIG. 9 and FIG. 10 show a different embodiment relating to a temperature detecting apparatus. The metal cap 1 has a portion whose diameter is gradually spreading from the closed end side to the opening, and in this construction the metal cap 1 can be easily fitted to one end of the first metal pipe 5.

Meanwhile, what is shown in FIG. 9 and FIG. 10 is the temperature detecting apparatus in which the forward side of the junction of the metal cap 1 to the first metal pipe 5 is in a shape of a flat shape gradually toward the closed end, and different from the flat processing of the metal cap 1 immediately at one end of the first metal pipe 5, which can prevent lowering of insulation resistance due to too close of a distance of the metal cap 1 and the first and second metal wires 3 at one end of the first metal pipe 5.

Moreover, in the construction in FIG. 9 and FIG. 10, the metal cap 1 is gradually reduced in wall thickness from the opening toward the closed portion, and since the closed portion side of the metal cap 1 accommodating the temperature detecting element 2 is thin, the heat can be transmitted to the temperature detecting element more quickly, and hence the heat response characteristic can be improved also from this respect, and such thin wall thickness can be easily formed by drawing process of the metal cap 1.

Figure 11:
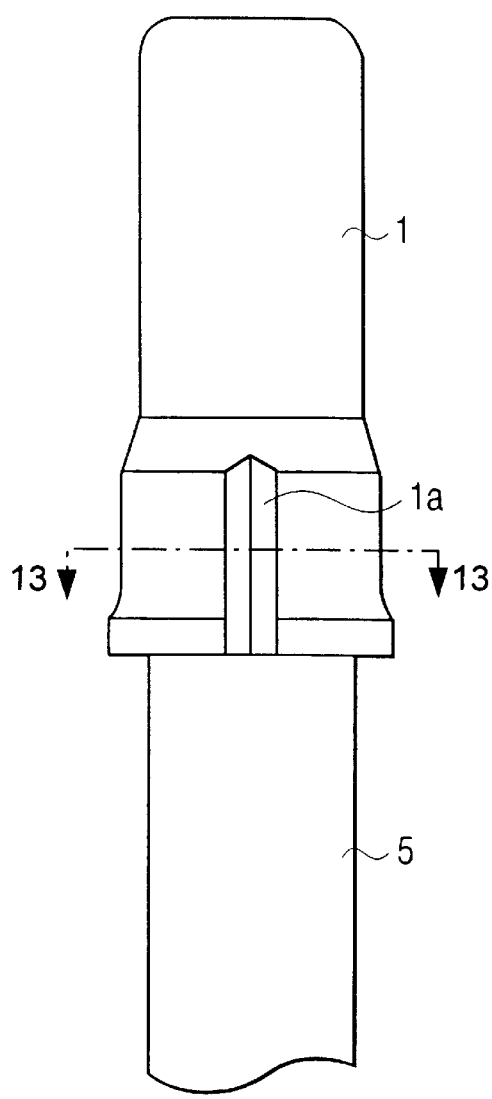
FIG. 11 is a front view of a further different embodiment of the invention.
Figure 12:
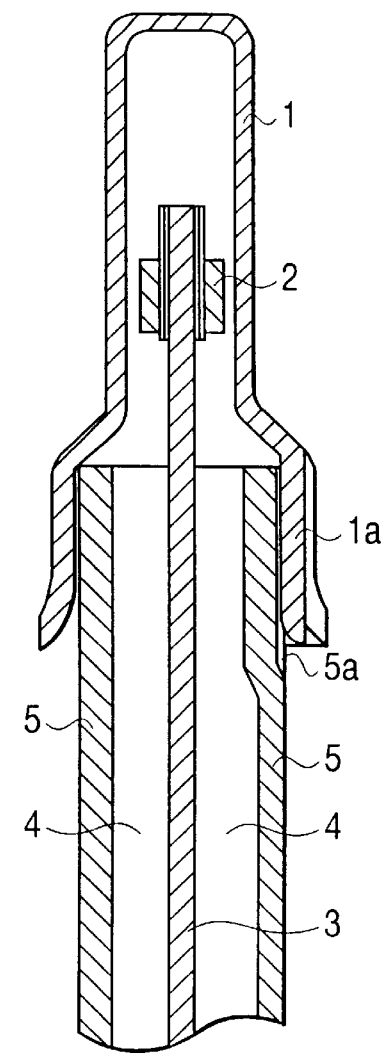
FIG. 12 is a side sectional view of the embodiment of FIG. 11.
Figure 13:
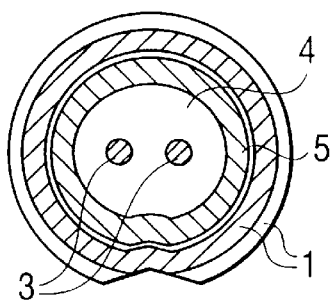
FIG. 13 is a sectional view taken on line 13—13 in FIG. 11.

FIG. 11 to FIG. 13 show another embodiment, in which a bump 1a is formed in one of a fitting portion of the first metal pipe and the metal cap, and a recess 5a to be fitted with the bump 1a is formed in another of the fitting portion of the first metal pipe and the metal cap, at the junction of the metal cap 1 and the first metal pipe 5. By a convex-concave fitting, the metal cap 1 of flat shape can be correctly mounted on the temperature detecting element 2 of similar flat shape, and not only damage of the temperature detecting element 2 is avoided, but also it does not impede improved heat response characteristic obtained by the combination of mutual flat shapes.

Figure 14:
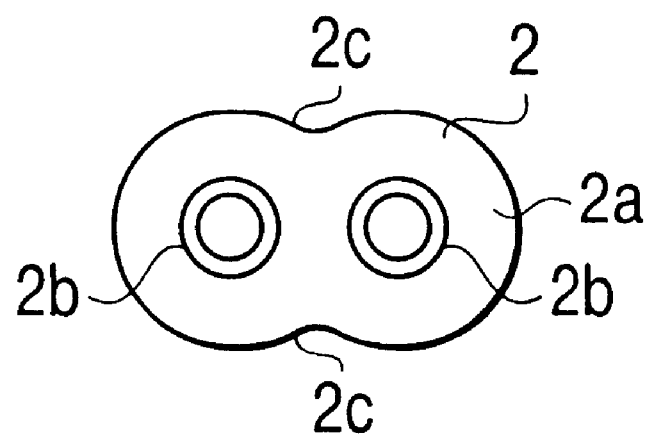
FIG. 14 is a top view of a temperature detecting element of yet another different embodiment of the invention.
Figure 15:
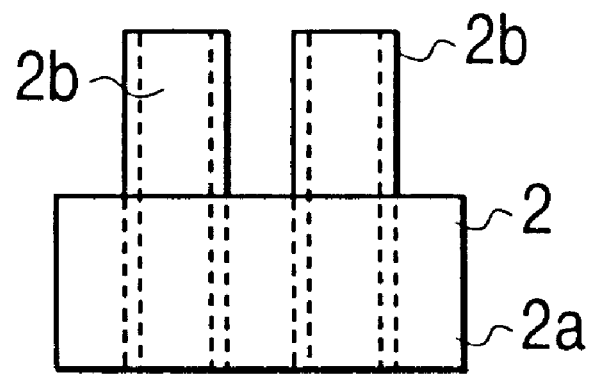
FIG. 15 is a front view of the temperature detecting element of FIG. 14.

FIG. 14 and FIG. 15 show a further different embodiment of the invention, in which a recess 2c is formed in the portion of the temperature detecting element 2 between the first and second metal wires 3. The formation of the recess 2c in the surface of the temperature detecting element 2, prevents the contact of the recess 2c with the inside of the metal cap 1, and hence it is effective to prevent significant lowering of insulation resistance between the metal wires 3 and metal cap 1 which may result from the contact of the surface of the temperature detecting element 2 with the inside of the portion of the metal cap 1 in a plane state.

Figure 16:
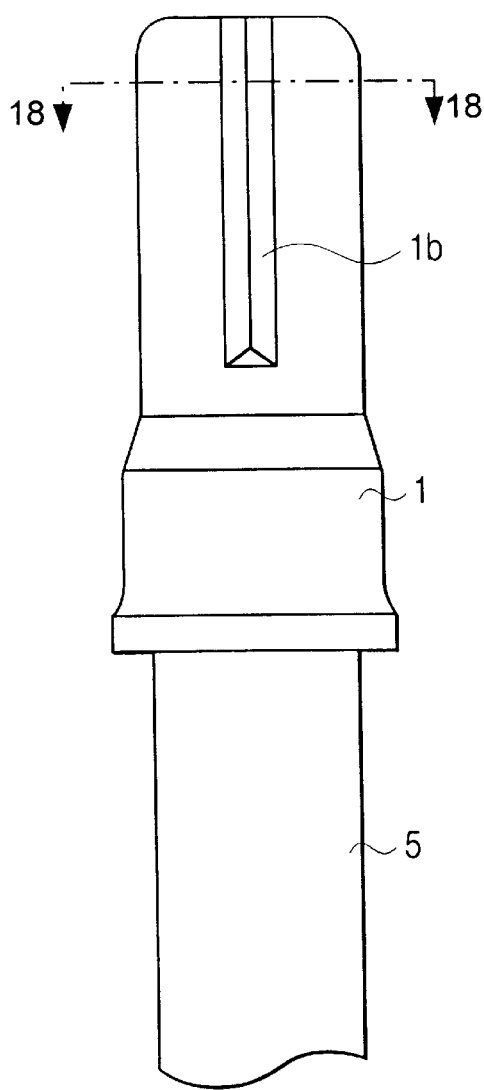
FIG. 16 is a front view of another different embodiment of the invention.
Figure 17:
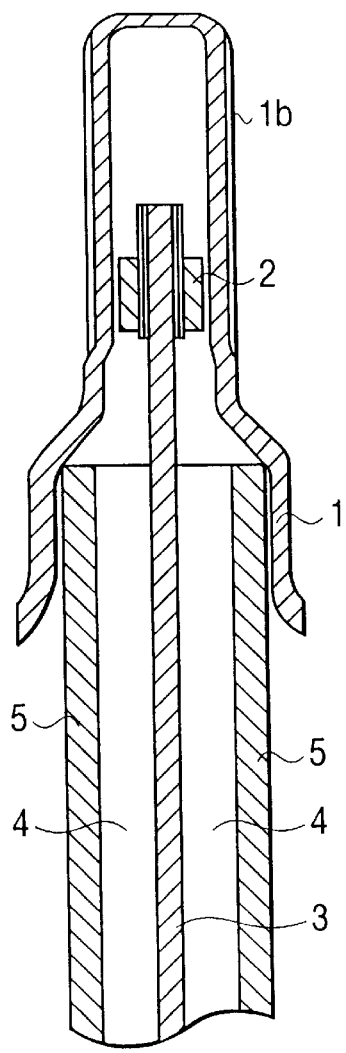
FIG. 17 is a side sectional view of the embodiment of FIG. 16.
Figure 18:
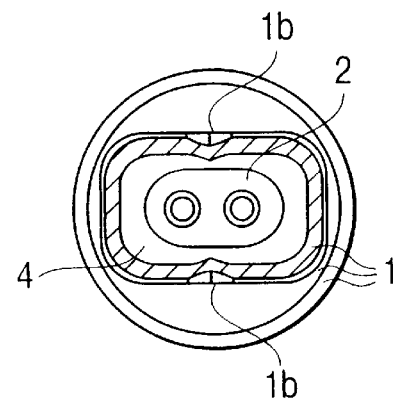
FIG. 18 is a sectional view taken on line 18—18 in FIG. 16.
Figure 19:
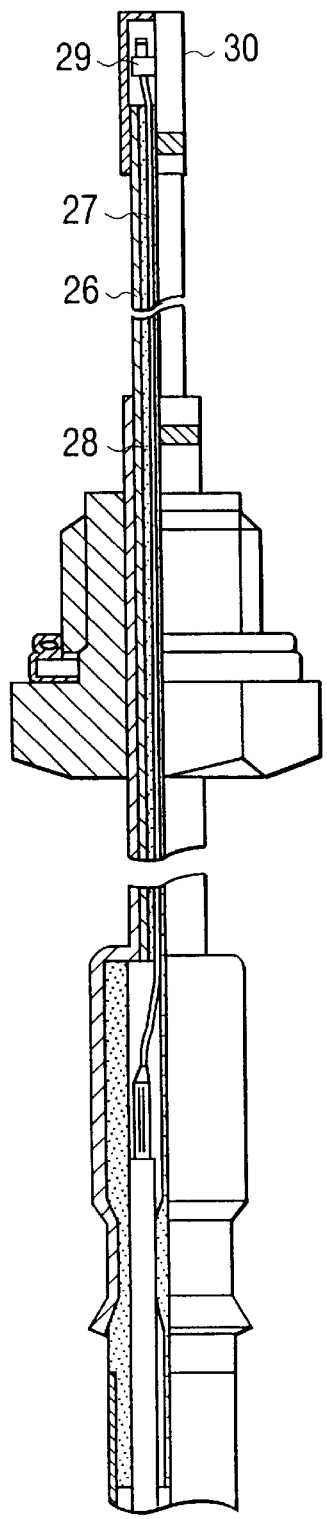
FIG. 19 is a front view showing a section of a half of a conventional temperature detecting apparatus.
Figure 20:
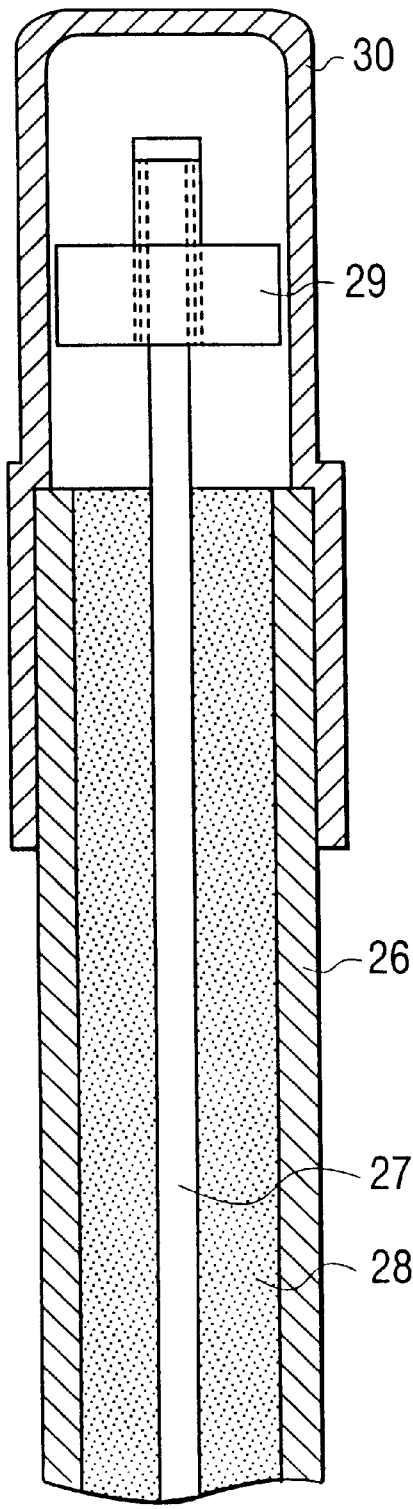
FIG. 20 is a side sectional view of a conventional temperature detecting element portion.
Figure 21:
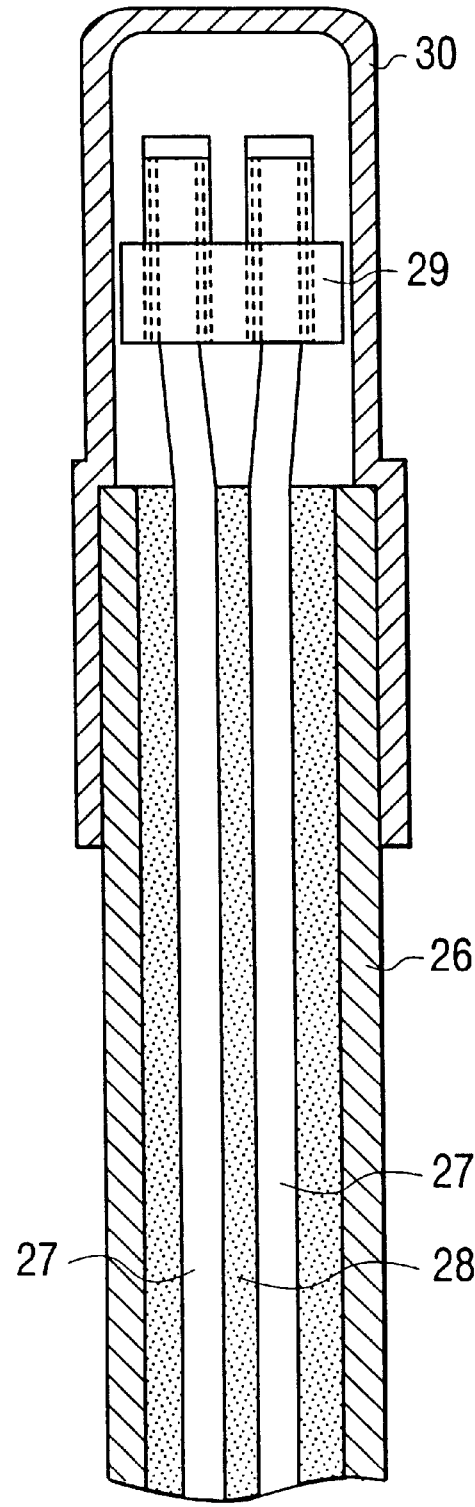
FIG. 21 is a front sectional view of a conventional temperature detecting element portion.
Figure 22:
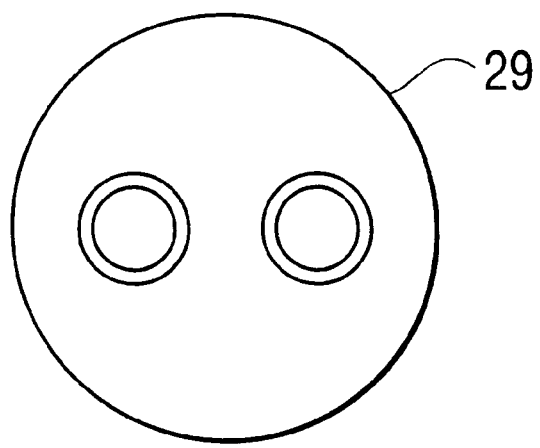
FIG. 22 is a top view of a conventional temperature detecting element.
Figure 23:
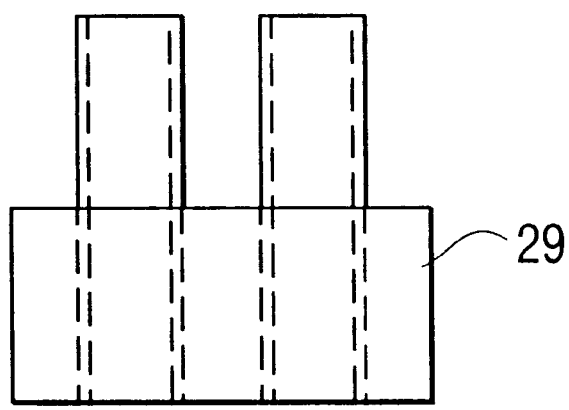
FIG. 23 is a front view of a conventional temperature detecting element.

FIG. 16 to FIG. 18 show another different embodiment, in which a protrusion 1b projecting toward the side of the temperature detecting element 2 is provided in the flat portion of the metal cap 1 confronting the temperature detecting element 2, and by thus forming the protrusion 1b on the metal cap 1, this protrusion 1b may possibly contact with the temperature detecting element 2 in spot state, but will not contact in plane state, thereby preventing significant lowering of insulation resistance between the metal cap 1 and the metal wires 3.

Moreover, in all embodiments of the invention, at least one of the metal cap 1 and the first metal pipe 5 should be preferably heat treated, before welding of metal cap 1 and the first metal pipe 5, at a temperature higher than the maximum operating temperature to which the temperature detecting apparatus is likely to be subjected. By heat treatment, a rigid oxide film can be formed on the heat treated surface of the metal cap 1 or the first metal pipe 5. Generally, when a metal is heated in an emission route, characteristically, it is oxidized by depleting oxygen from the surrounding, or it releases the gas adsorbed on the surface. However, the metal on which an oxide film is formed depletes a very small amount of oxygen from the surrounding or releases a very small amount of surface adsorption gas, as compared with the original metal surface. As a result, such a formation of the oxide film is effective to prevent problems associated with the deterioration of characteristics of the temperature detecting element 2 due to formation of an oxide film when metal is heated in the emission route by depleting of oxygen in the temperature detecting element 2 during use or release of unnecessary gas from the surface of the metal cap 1 or the first metal pipe 5.

In all embodiments of the invention, it is contemplated that a portion of the metal cap which faces the temperature detecting element may have the shape and may be located on the metal cap so that it would substantially correspond to the shape and location of the temperature detecting element. It is also contemplated in all embodiments that the temperature detecting element (and thus the portion of the metal cap confronting the temperature detecting element) may have either a substantially flat or a flat shape.

The application of the temperature detecting apparatus of the invention in the automobile is described specifically, but various other applications are possible. For example, when used in liquid or gas, the temperature detecting apparatus may be used as a temperature detecting apparatus excellent in thermal response. The invention may be also changed and modified in various manners. For example, materials of construction of the temperature detecting element and/of the insulator 4 may be changed if desired, depending on the environment in which the temperature detecting apparatus is used or other factors, apparent to those skilled in the art. Furthermore, the shape of the temperature detecting element may be changed. Thus, the temperature detecting element may be, triangular, trapezoidal or circular in shape. Therefore, modified examples existing in the true spirit and scope of the invention are all included in the scope of the claims.

What is claimed is:

1. A temperature detecting apparatus comprising a first metal pipe, a first metal wire and a second metal wire disposed in the first metal pipe, at least one end of the first metal wire and at least one end of the second metal wire being projected from the same end of the first metal pipe, an insulator for providing an electric insulation for the first metal wire and the second metal wire in the first metal pipe, a temperature detecting element disposed between the ends of the first metal wire and the second metal wire, said temperature detecting element surrounding said first metal wire and said second metal wire, and a metal cap coupled to one end of the first metal pipe for enclosing the temperature detecting element, wherein the temperature detecting element has an oval shape defining a first axis that intersects said first metal wire and said second metal wire, and a second axis that extends perpendicularly to said first axis, said temperature detecting element having a width taken along said first axis which is longer than the width of said temperature detecting element taken along said second axis, and a portion of the metal cap surrounding the temperature detecting element has an oval shape which conforms to the temperature detecting element, said portion of said metal cap surrounding the temperature detecting element defining a third axis that intersects said first metal wire and said second metal wire, and a fourth axis that extends perpendicularly to said third axis, said portion of said metal cap surrounding the temperature detecting element having a width taken along said third axis which is longer than the width of said portion of said metal cap taken along said fourth axis, wherein the ratio of said second axis to said first axis is less than 70 percent.

2. A temperature detecting apparatus of claim 1, wherein at least one of the metal cap and the first metal pipe has an oxide film formed thereon, said oxide film formed by heating said metal cap or first metal pipe at a higher temperature than the maximum operating temperature.

3. A temperature detecting apparatus according to claim 1, wherein the temperature detecting element comprises a first surface and a second surface both of which extend parallel to said first axis, and parallel to said first metal wire and said second metal wire, said first surface and said second surface being flat.

4. An automobile including a temperature detecting apparatus, comprising a first metal pipe, a first metal wire and a second metal wire disposed in the first metal pipe, at least one end of the first metal wire and at least one end of the second metal wire being projected from the same end of the first metal pipe, an insulator for providing an electric insulation for the first metal wire and the second metal wire in the first metal pipe, a temperature detecting element disposed between ends of the first metal wire and the second metal wire, said temperature detecting element surrounding said first metal wire and said second metal wire, and a metal cap coupled to one end of the first metal pipe for enclosing the temperature detecting element, wherein the temperature detecting element has an oval shape defining a first axis that intersects said first metal wire and said second metal wire, and a second axis that extends perpendicularly to said first axis, said temperature detecting element having a width taken along said first axis which is longer than the width of said temperature detecting element taken along said second axis, and a portion of the metal cap surrounding the temperature detecting element has an oval shape which conforms to the temperature detecting element, said portion of said metal cap surrounding the temperature detecting element defining a third axis that intersects said first metal wire and said second metal wire, and a fourth axis that extends perpendicularly to said third axis, said portion of said metal cap surrounding the temperature detecting element having a width taken along said third axis which is longer than the width of said portion of said metal cap taken along said fourth axis, said temperature detecting apparatus disposed in an emission route .

wherein the ratio of said second axis to said first axis is less than 70 percent.

5. An automobile of claim 4, wherein the temperature detecting apparatus comprises at least one surface extending parallel to said first axis, said at least one surface being substantially flat, and disposed so that said at least one surface confronts the emission route such that the emission flow direction is parallel to said at least one surface.

6. A method of detecting temperature of an environment comprising the steps of inserting a temperature detecting apparatus into the environment and recording the temperature, said temperature recording apparatus comprising a first metal pipe, a first metal wire and a second metal wire disposed in the first metal pipe, at least one end of the first metal wire and at least one end of the second metal wire being projected from the same end of the first metal pipe, an insulator for providing an electric insulation for the first metal wire and the second metal wire in the first metal pipe, a temperature detecting element disposed between the ends of the first metal wire and the second metal wire, said temperature detecting element surrounding said first metal wire and said second metal wire, and a metal cap coupled to one end of the first metal pipe for enclosing the temperature detecting element, wherein the temperature detecting element has an oval shape defining a first axis that intersects said first metal wire and said second metal wire, and a second axis that extends perpendicularly to said first axis, said temperature detecting element having a width taken along said first axis which is longer than the width of said temperature detecting element taken along said second axis, and a portion of the metal cap surrounding the temperature detecting element has an oval shape which conforms to the temperature detecting element, said portion of said metal cap surrounding the temperature detecting element defining a third axis that intersects said first metal wire and said second metal wire, and a fourth axis that extends perpendicularly to said third axis, said portion of said metal cap surrounding the temperature detecting element having a width taken along said third axis which is longer than the width of said portion of said metal cap taken along said fourth axis, wherein the ratio of said second axis to said first axis is less than 70 percent.

7. A method of claim 6, wherein the environment comprises automobile emissions, liquid or gas.

8. A method of detecting temperature of an environment according to claim 6, wherein the temperature detecting element comprises a first surface and a second surface both of which extend parallel to said first axis, and parallel to said first metal wire and said second metal wire, said first surface and said second surface being flat.

* * * * *